(12) United States Patent
Wang et al.

(10) Patent No.: US 11,082,974 B2
(45) Date of Patent: Aug. 3, 2021

(54) COMMUNICATION PROCESSING METHOD AND APPARATUS

(71) Applicant: HUAWEI TECHNOLOGIES CO., LTD., Guangdong (CN)

(72) Inventors: Yafei Wang, Shanghai (CN); Xiaojun Ma, Shanghai (CN); Chi Zhang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/566,622

(22) Filed: Sep. 10, 2019

(65) Prior Publication Data

US 2020/0008195 A1    Jan. 2, 2020

Related U.S. Application Data

(63) Continuation of application No. PCT/CN2018/114980, filed on Nov. 12, 2018.

(30) Foreign Application Priority Data

Nov. 17, 2017    (CN) .......................... 201711149022.4

(51) Int. Cl.
*H04W 72/04* (2009.01)
*H04L 5/14* (2006.01)
(Continued)

(52) U.S. Cl.
CPC ........... *H04W 72/0446* (2013.01); *H04L 5/14* (2013.01); *H04W 56/001* (2013.01); *H04W 72/082* (2013.01)

(58) Field of Classification Search
None
See application file for complete search history.

(56) References Cited

U.S. PATENT DOCUMENTS 10,608,860 B2 * 3/2020 Davydov .............. H04W 48/12
2012/0020256 A1 * 1/2012 Tujkovic ............... H04W 16/14
370/278

(Continued)

FOREIGN PATENT DOCUMENTS

CN        102315877 A        1/2012
CN        106888457 A        6/2017
(Continued)

OTHER PUBLICATIONS

NTT Docomo, Inc., "Initial views on frame structure for NR access technology", 3GPP TSG RAN WG1 Meeting #84bis R1-163112, Busan, Korea Apr. 11-15, 2016, total 7 pages.

*Primary Examiner* — Anh Vu H Ly
(74) *Attorney, Agent, or Firm* — Womble Bond Dickinson (US) LLP

(57) ABSTRACT

Embodiments of this application provide a communication processing method. A time domain location of a time domain resource configuration that is in a first wireless communications system and that is aligned with a time domain resource configuration in a second wireless communications system is determined based on a time offset, and a terminal performs data transmission with the first wireless communications system at the determined time domain location. In this way, interference with the second communications system is avoided.

12 Claims, 5 Drawing Sheets

US 11,082,974 B2

Page 2

(51) Int. Cl.
*H04W 56/00* (2009.01)
*H04W 72/08* (2009.01)

(56) References Cited

U.S. PATENT DOCUMENTS

| | | | | |
|---|---|---|---|---|
| 2015/0173004 | A1* | 6/2015 | Nigam | H04W 56/001 |
| | | | | 370/331 |
| 2018/0124744 | A1* | 5/2018 | Xue | H04W 72/005 |
| 2018/0234930 | A1* | 8/2018 | Chen | H04L 5/14 |
| 2018/0302205 | A1* | 10/2018 | Abedini | H04L 5/0053 |
| 2018/0367289 | A1* | 12/2018 | Kim | H04L 5/0096 |
| 2019/0089498 | A1* | 3/2019 | Pelletier | H04W 72/005 |
| 2019/0090218 | A1* | 3/2019 | Noh | H04W 72/1289 |
| 2019/0132170 | A1* | 5/2019 | Si | H04L 27/266 |
| 2019/0141696 | A1* | 5/2019 | Kim | H04L 5/0055 |
| 2019/0327744 | A1* | 10/2019 | Sun | H04W 56/0005 |
| 2019/0357264 | A1* | 11/2019 | Yi | H04L 5/001 |
| 2020/0029297 | A1* | 1/2020 | Baek | H04W 76/16 |
| 2020/0154496 | A1* | 5/2020 | Yi | H04W 72/10 |
| 2020/0163095 | A1* | 5/2020 | Kim | H04W 76/16 |
| 2020/0205156 | A1* | 6/2020 | Adjakple | H04W 74/0833 |
| 2020/0236524 | A1* | 7/2020 | Ye | H04L 5/0044 |
| 2020/0252895 | A1* | 8/2020 | Yi | H04W 74/0833 |

FOREIGN PATENT DOCUMENTS

| | | |
|---|---|---|
| CN | 107734695 A | 2/2018 |
| EP | 2941006 A1 | 11/2015 |
| EP | 3432637 A1 | 1/2019 |
| WO | 2017044142 A1 | 3/2017 |
| WO | 2017164348 A1 | 9/2017 |

* cited by examiner

COMMUNICATION PROCESSING METHOD AND APPARATUS

CROSS-REFERENCE TO RELATED APPLICATIONS

This application is a continuation of International Application No. PCT/CN2018/114980, filed on Nov. 12, 2018, which claims priority to Chinese Patent Application No. 201711149022.4, filed on Nov. 17, 2017. The disclosures of the aforementioned applications are hereby incorporated by reference in their entireties.

TECHNICAL FIELD

Embodiments of this application relate to the field of wireless communications, and in particular, to a communication processing method and apparatus.

BACKGROUND

In a wireless communications system, a terminal and a radio access device serving the terminal each include, based on protocol layers, a physical (PHY) layer, a media access control (MAC) layer, a radio link control (RLC) layer, a packet data convergence protocol (PDCP) layer, a radio resource control (RRC) layer, and the like.

A physical channel is a channel used for transmitting information processed by a physical layer. Different types of physical channels may transmit different types of information processed by the physical layer. A physical downlink control channel (PDCCH) is a main channel for transmitting physical layer control signaling on a down link, and may be used to indicate a location of a time-frequency resource for uplink data transmission or downlink data transmission.

On the physical channel, a time-frequency resource is divided into a plurality of grids, and a minimum grid consists of one time domain symbol and one unit frequency. Optionally, a time domain symbol may be an orthogonal frequency division multiplexing (OFDM) symbol or a single carrier frequency division multiple access (SC-FDMA) symbol; and a unit frequency may be a subcarrier of 15 kHz or 60 Hz. A transmission time unit may include at least two time domain symbols, such as seven or 14 time domain symbols.

In a long term evolution (LTE) time division multiplexing (TDD) system, a transmission time unit is a subframe. This subframe includes two slots, and each slot includes six or seven time domain symbols. The radio access device performs a time domain resource configuration for data transmission based on a granularity of the entire transmission time unit, that is, a type of a transmission time unit are a downlink time domain resource or an uplink time domain resource.

In a fifth-generation wireless communications system (5G system), a transmission time unit is a slot including seven or 14 time domain symbols. The radio access device performs a time domain resource configuration for data transmission based on a granularity of at least one time domain symbol in a slot, that is, types of some time domain symbols in a slot are an uplink time domain resource type, types of some time domain symbols are a downlink time domain resource type, and types of some other time domain symbols are an unknown type, where on the time domain symbols of the unknown type, the terminal neither receives downlink data nor transmits uplink data. The radio access device in the 5G system may indicate, to the terminal through a PDCCH such as a group common PDCCH, whether the type of each time domain symbol in this slot is the uplink time domain resource type, the downlink time domain resource, or the unknown type.

In the case of co-existence of the LTE TDD system with the 5G system, the terminal may be served by both the systems. To co-exist with the LTE TDD system, the 5G system can perform a flexible time domain resource configuration to co-exist with the LTE TDD system. However, at a same data transmission moment, some transmission time units or some time domain symbols are of the uplink time domain resource type in one of the two systems, so that uplink data transmission exists, and are of the downlink time domain resource type in the other system, so that downlink data transmission exists, causing interference.

SUMMARY

Embodiments of this application provide a communication processing method, to cancel interference caused by a possibility that both uplink data transmission and downlink data transmission exist between different communications systems at a same data transmission moment because of different time domain resource configurations.

A first aspect of the embodiments of this application provides a communication processing method, applied to a terminal or a chip in the terminal, and including:

obtaining first information sent by a first wireless communications system, where the first information is used to determine a time offset of a time domain resource configuration in the first wireless communications system;

determining a time domain location of the time domain resource configuration in the first wireless communications system based on the time offset; and performing data transmission at the time domain location based on the time domain resource configuration in the first wireless communications system.

The technical solution according to the first aspect is applied. The time domain location of the time domain resource configuration that is in the first wireless communications system and that is aligned with a time domain resource configuration in a second wireless communications system is determined based on the time offset, and the terminal performs the data transmission with the first wireless communications system at the determined time domain location. In this way, interference with the second wireless communications system is avoided. Moreover, when determining the time domain location of the time domain resource configuration by using the time offset, the terminal does not perceive whether the second wireless communications system exists.

Based on the first aspect, in a first implementation of the first aspect, the first information is the time offset or an index of the time offset; or the first information is an index of a time domain resource configuration in a second wireless communications system, and the time domain resource configuration in the second wireless communications system corresponds to the time offset.

In this implementation, an implementation of the first information may be the time offset or the index of the time offset, or the time offset corresponds to the time domain resource configuration in the second wireless communications system. A unit of the time offset may be a transmission time unit or at least one time domain symbol.

Based on the first aspect and the first implementation of the first aspect, in a second implementation of the first aspect, the time offset is used to align transmission time units that have a same time domain resource type in an uplink and downlink switching period and that are in the first wireless communications system and the second wireless communications system.

In this implementation, it is further limited in such a manner that the time offset may be used to align the transmission time units that have the same time domain resource type in the uplink and downlink switching period. That is, at the same transmission moment, either uplink data transmission or downlink data transmission is performed between the first wireless communications system and the second wireless communications system. In this way, interference is avoided.

Based on the first implementation or the second implementation of the first aspect, in a third implementation of the first aspect, the first wireless communications system is a fifth-generation wireless communications system, and the second wireless communications system is an LTE system; and there is the following correspondence between the time domain resource configuration in the second wireless communications system and the time offset:

| Index of a time domain resource configuration in the LTE system | 0 | 1 | 2 | 3 | 4 | 5 |
|---|---|---|---|---|---|---|
| Time offset (unit: transmission time unit) | (0+E)%5 | (1+E)%5 | (2+E)%5 | (5+E)%10 | (6+E)%10 | (7+E)%10 | where E is a timing offset between the second wireless communications system and the first wireless communications system, and when timing is synchronized between the first wireless communications system and the second wireless communications system, a value of the timing offset is 0.

In this implementation, the time domain resource configuration in the second wireless communications system corresponds to the time offset. The first wireless communications system may notify the terminal of the used time domain resource configuration, so that the terminal determines the time offset based on the foregoing correspondence.

Based on the third implementation of the first aspect, in a fourth implementation of the first aspect, the method further includes:

obtaining second information sent by the first wireless communications system, where the second information indicates a timing offset of the first wireless communications system.

In this implementation, considering that the timing offset may exist in the first wireless communications system, the timing offset may be used as a reference factor for determining the time offset.

A second aspect of the embodiments of this application provides a communication processing method, applied to a radio access device in a first wireless communications system or a chip in the radio access device. The method includes the following content:

determining a time offset of a time domain resource configuration in the first wireless communications system; determining, based on the time offset, a time domain location of the time domain resource configuration that is in the first wireless communications system and that is aligned with a time domain resource configuration in a second wireless communications system in an uplink and downlink switching period; and performing data transmission with a terminal at the time domain location based on the time domain resource configuration in the first wireless communications system.

The technical solution according to this implementation is applied. The time domain location of the time domain resource configuration that is in the first wireless communications system and that is aligned with the time domain resource configuration in the second wireless communications system is determined based on the time offset, and the terminal performs the data transmission with the first wireless communications system at the determined time domain location. In this way, interference with the second wireless communications system is avoided.

Based on the second aspect, in a first implementation of the second aspect, the method further includes:

sending first information to the terminal, where the first information is used by the terminal to determine the time offset.

In this implementation, the terminal can obtain the time offset to determine the time domain location of the time domain resource configuration for performing the data transmission with the first wireless communications system.

Based on the first implementation of the second aspect, in a second implementation of the second aspect, the first information is the time offset or an index of the time offset; or the first information is an index of a time domain resource configuration in a second wireless communications system, and the time domain resource configuration in the second wireless communications system corresponds to the time offset.

In this implementation, an implementation of the first information is enumerated, so that the first information can be flexibly sent.

Based on any one of the second aspect to the second implementation of the second aspect, in a third implementation of the second aspect, the time offset is used to align transmission time units that have a same time domain resource type in an uplink and downlink switching period and that are in the first wireless communications system and the second wireless communications system.

In this implementation, it is further limited in such a manner that the time offset may be used to align the transmission time units that have the same time domain resource type in the uplink and downlink switching period. That is, at the same transmission moment, either uplink data transmission or downlink data transmission is performed between the first wireless communications system and the second wireless communications system.

Based on the second implementation or the third implementation of the second aspect, in a fourth implementation of the second aspect, the first wireless communications system is a fifth-generation wireless communications system, and the second wireless communications system is an LTE system; and there is the following correspondence between the time domain resource configuration in the second wireless communications system and the time offset:

| Index of a time domain resource configuration in the LTE system | 0 | 1 | 2 | 3 | 4 | 5 |
|---|---|---|---|---|---|---|
| Time offset (unit: transmission time unit) | (0+E)%5 | (1+E)%5 | (2+E)%5 | (5+E)%10 | (6+E)%10 | (7+E)%10 | where E is a timing offset between the second wireless communications system and the first wireless communications system, and when timing is synchronized between the first wireless communications system and the second wireless communications system, a value of the timing offset is 0.

In this implementation, the time domain resource configuration in the second wireless communications system corresponds to the time offset. The first wireless communications system may notify the terminal of the used time domain resource configuration, so that the terminal determines the time offset based on the foregoing correspondence.

Based on the fifth implementation of the second aspect, in a sixth implementation of the second aspect, the method further includes:

determining a timing offset of the first wireless communications system.

Based on the sixth implementation of the second aspect, in a seventh implementation of the second aspect, the method further includes:

sending second information to the terminal, where the second information indicates the timing offset of the first wireless communications system.

In the sixth and seventh implementations, because the timing offset of the first wireless communications system may be used as a reference factor of the time offset, the terminal learns of the timing offset, to help determine the time domain offset more accurately.

A third aspect of the embodiments of this application provides a communication processing apparatus. The communication processing apparatus includes an obtaining unit, a determining unit, and a transmission unit. The obtaining unit is configured to perform an obtaining action in any one of the first aspect to the implementations of the first aspect, the determining unit is configured to perform a determining action according to any one of the first aspect to the implementations of the first aspect, and the transmission unit is configured to perform actions such as a receiving action and a sending action according to any one of the first aspect to the implementations of the first aspect. In a physical implementation, the obtaining unit and the transmission unit may be a transceiver circuit, and the determining unit may be a processing circuit. The communication processing apparatus may be a terminal or may be a chip in the terminal. The chip includes a plurality of gate circuits to implement functions of the foregoing functional units. The communication processing apparatus according to the third aspect may implement beneficial effects achieved by any one of the first aspect to the implementations of the first aspect. Details are not described again.

In an embodiment, a communication processing apparatus, wherein the communication processing apparatus is a radio access device in a first wireless communications system or a chip in the radio access device. The communication processing apparatus includes a determining unit, configured to: determine a time offset of a time domain resource configuration in the first wireless communications system, and determine a time domain location of the time domain resource configuration in the first wireless communications system based on the time offset; and a transmission unit, configured to perform data transmission with a terminal at the time domain location based on the time domain resource configuration in the first wireless communications system. The transmission unit can be further configured to send first information to the terminal, wherein the first information is used by the terminal to determine the time offset. The first information can be the time offset or an index of the time offset; or the first information can be an index of a time domain resource configuration in a second wireless communications system, and the time domain resource configuration in the second wireless communications system can correspond to the time offset. The time offset can be used to align transmission time units that have a same time domain resource type in an uplink and downlink switching period and that are in the first wireless communications system and the second wireless communications system.

In an embodiment, the first wireless communications system can be a fifth-generation wireless communications system, and the second wireless communications system can be a long term evolution (LTE) system; and there can be the following correspondence between the time domain resource configuration in the second wireless communications system and the time offset:

| Index of a time domain resource configuration in the LTE system | 0 | 1 | 2 | 3 | 4 | 5 |
|---|---|---|---|---|---|---|
| Time offset (unit: transmission time unit) | (0+E) %5 | (1+E) %5 | (2+E) %5 | (5+E) %10 | (6+E) %10 | (7+E) %10 |

"E" can be a timing offset between the second wireless communications system and the first wireless communications system, and when timing is synchronized between the first wireless communications system and the second wireless communications system, a value of the timing offset can be 0. In an embodiment, the determining unit can further be configured to determine a timing offset of the first wireless communications system. The transmission unit can be further configured to send second information to the terminal, wherein the second information indicates the timing offset of the first wireless communications system.

A fourth aspect of the embodiments of this application provides a communication processing apparatus. The communication processing apparatus includes a determining unit and a transmission unit. The determining unit is configured to perform a determining action in any one of the second aspect to the implementations of the second aspect, and the transmission unit is configured to perform actions such as a receiving action or a sending action according to any one of the second aspect to the implementations of the second aspect. In a physical implementation, the transmission unit may be a transceiver circuit, and the determining unit may be a processing circuit. The communication processing apparatus may be a radio access device in the first wireless communications system or may be a chip in the radio access device. The chip includes a plurality of gate circuits to implement functions of the foregoing functional units. The communication processing apparatus according to the fourth aspect may implement beneficial effects achieved by any one of the second aspect to the implementations of the second aspect. Details are not described again.

A fifth aspect of the embodiments of this application provides a communications apparatus, including a processor and a memory. The memory stores computer program code. When the code is invoked by the processor, the method according to any one of the first aspect to the implementations of the first aspect or any one of the second aspect to the implementations of the second aspect is implemented. Optionally, the communications apparatus according to the fifth aspect may be a chip system or a terminal including the chip system. The communications apparatus according to the fifth aspect may implement beneficial effects achieved by any one of the first aspect to the implementations of the first aspect or any one of the second aspect to the implementations of the second aspect. Details are not described again.

A sixth aspect of the embodiments of this application provides a computer storage medium. The computer storage medium stores code. The code is used to implement the method according to any one of the first aspect to the implementations of the first aspect or any one of the second aspect to the implementations of the second aspect. The computer storage medium according to the sixth aspect may be included in a chip system, or included in a terminal or a radio access device. The computer storage medium according to the sixth aspect may implement beneficial effects achieved by any one of the first aspect to the implementations of the first aspect or any one of the second aspect to the implementations of the second aspect. Details are not described again.

DESCRIPTION OF EMBODIMENTS

Figure 1:
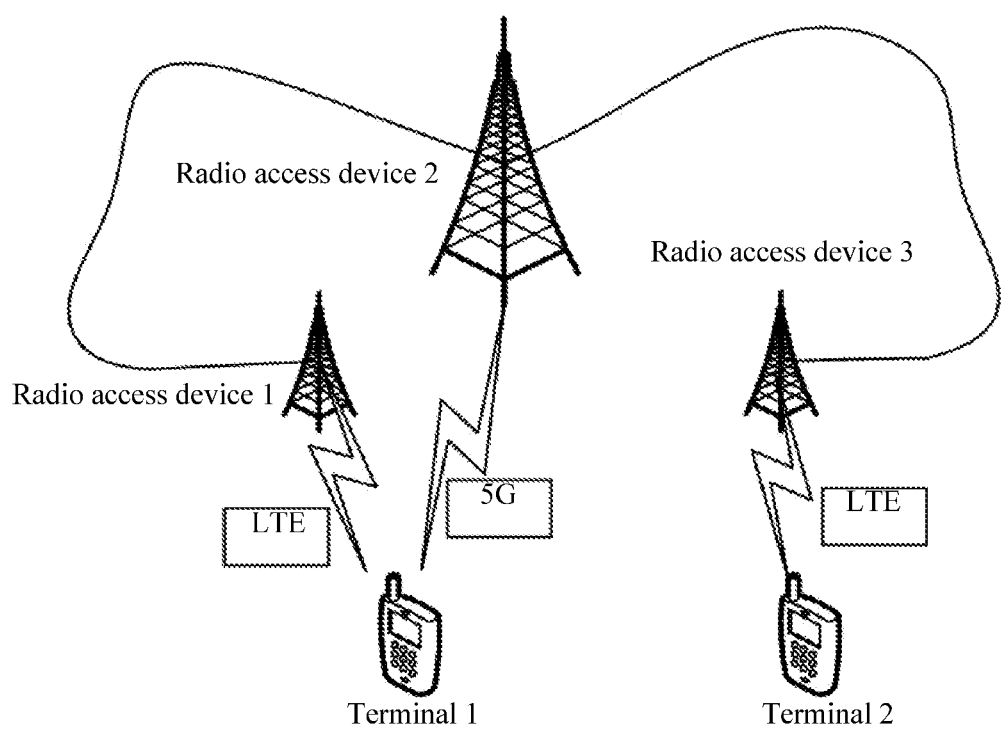
FIG. 1 is a schematic architectural diagram of a wireless communications system according to an embodiment of this application.

In a schematic architectural diagram of a wireless communications system shown in FIG. 1, a radio access device, such as a base station, a wireless local area network access node, or another transmission reception point (TRP) provides a terminal with an access service in a licensed spectrum or an access service in an unlicensed spectrum. The terminal and the radio access device transmit, based on a protocol layer, various types of data such as control signaling or service data over an air interface on an up link and a down link. The control signaling is mainly transmitted on a control channel, and the service data is mainly transmitted on a traffic channel. Divided based on the protocol layer, the radio access device may further include a control unit (CU) and at least one distributed unit (DU). The CU is configured to implement functions of a PDCP layer, an RRC layer, and a protocol layer higher than the PDCP layer and the RRC layer of the radio access device; and the DU is configured to implement a function of a protocol layer lower than the PDCP layer.

The wireless communications system shown in FIG. 1 may be a wireless communications system such as a new radio (NR) system (also referred to as a 5G system), LTE, a long term evolution advanced (LTE-A) system, or an evolved long term evolution (eLTE) system.

In various embodiments of this application, the terminal, also referred to as user equipment (UE), is a device that provides a user with a voice and/or data connectivity, such as a handheld device having a wireless connection function or an in-vehicle device. A common terminal, for example, includes a mobile phone, a tablet computer, a notebook computer, a palmtop computer, a mobile internet device (MID), and a wearable device such as a smartwatch, a smart band, or a pedometer.

In FIG. 1, an LTE TDD system may co-exist with the 5G system by using a time domain resource configuration (as shown in Table 1) in the LTE TDD system, to jointly provide a communication service for a terminal 1. A radio access device 1 in the LTE TDD system and a radio access device 2 in the 5G system may be separate physical devices, or may be a same co-site physical device. In addition to the co-existence scenario, when a cell in the LTE TDD system is neighboring to a cell in the 5G system, the 5G system may provide a communication service for the terminal 1, and the LTE TDD system may provide a communication service for a terminal 2.

It can be learned from Table 1 that the time domain resource configuration in the LTE TDD system includes two types of periods: a 5-millisecond (ms) period and a 10-ms period. For the 5-ms period, a subframe 1 and a subframe 6 are fixedly special subframes. For the 10-ms period, the subframe 1 is fixedly a special subframe. Each special subframe includes a downlink part of the special subframe, a guard period (GP), and an uplink part of the special subframe. A next subframe after each special subframe is always used to transmit uplink data.

Because a time domain resource configuration in the 5G system is relatively flexible, in 5G, a time domain resource configuration that is in the 5G system and that corresponds to any one of the time domain resource configurations in the LTE TDD system in Table 1 may be exhaustively presented based on a feature of the foregoing time domain resource configuration in the LTE TDD system. The time domain resource configuration in the 5G system includes a downlink time domain resource configuration, an uplink time domain resource configuration, and an unknown type of configuration.

A specific period of the downlink time domain resource configuration is used as an example. For the downlink time domain resource configuration: at the beginning of the period, x1 transmission time units are configured to be of a downlink time domain resource type (a value of x1 falls within a range of 0 to a total quantity of transmission time units in this period); in an $(x1+1)^{th}$ transmission time unit, x2 time domain symbols are configured to be of the downlink time domain resource type (a value of x2 falls within a range of 0 to a total quantity of time domain symbols in this transmission time unit), x3 time domain symbols are configured to be of an unknown type, and x4 time domain symbols are configured to be of an uplink time domain resource type (x2+x3+x4=the quantity of time domain symbols in this transmission time unit); and then, y1 transmission time units start to be configured, from an $(x1+2)^{th}$ transmission time unit, to be of the uplink time domain resource type. The 5G system may perform the foregoing configuration based on different time domain resource configurations in LTE TDD in Table 1, so that the 5G system co-exists with the LTE TDD system.

TABLE 1

Time domain resource configuration in LTE

| Time domain resource configuration | Uplink and downlink switching period | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

D indicates a downlink subframe (a transmission time unit in the LTE system is a subframe), used for downlink data transmission. U indicates an uplink subframe used for uplink data transmission. S indicates a special subframe.

Although the LTE TDD system can co-exist with the 5G system in the foregoing manner, at a same data transmission moment, there is a case in which uplink data transmission and downlink data transmission both exist on some transmission time units, causing signal interference. For example, as shown in Table 2, in a radio frame, a time domain resource configuration in 5G co-exists with a time domain resource configuration 2 in LTE TDD. Assuming that the LTE TDD system and the 5G system both start transmission from a transmission time unit 0 at a same data transmission moment, signal interference is caused because uplink data transmission and downlink data both exist on transmission time units 2, 3, 4, 7, 8, and 9.

TABLE 2

Time domain resource configuration in 5G co-exists with the time domain resource configuration 2 in LTE TDD

| Transmission time unit (1 ms) LTE: subframes 0 to 9 5G: slots 0 to 9 | 0 | 1 | 2 | 3 | 4 | 5 | 6 | 7 | 8 | 9 |
|---|---|---|---|---|---|---|---|---|---|---|
| Time domain resource configuration 2 in LTE TDD | D | S | U | D | D | D | S | U | D | D |
| Corresponding time domain resource configuration in 5G | D | D | D | D + Un + U | U | D | D | D | D + Un + U | U |

D+Un+U indicates that some time domain symbols in this transmission time unit are of the downlink time domain resource type and are used for downlink data transmission; some time domain symbols are of the unknown type; and some time domain symbols are of the uplink time domain resource type and are used for uplink data transmission.

For ease of understanding, the foregoing description is made by using an example of co-existence of the LTE system with the 5G system. However, the foregoing problem of interference may occur for time domain resource configurations in any two different wireless communications systems.

Therefore, in view of the foregoing technical problem, a first embodiment of this application provides a communication processing method, to determine a time offset between time domain resource configurations in different wireless communications systems. The time offset is used to avoid interference caused by existence of both uplink data transmission and downlink data transmission on the transmission time units at a same data transmission moment. It should be noted that data in the various embodiments of this application includes service data or control signaling. In the various embodiments of this application, actions performed by a wireless communications system may be performed by a radio access device in this wireless communications system. Radio access devices in the different wireless communications systems may be two physically separate devices, or may be a same co-site physical device.

Figure 2:
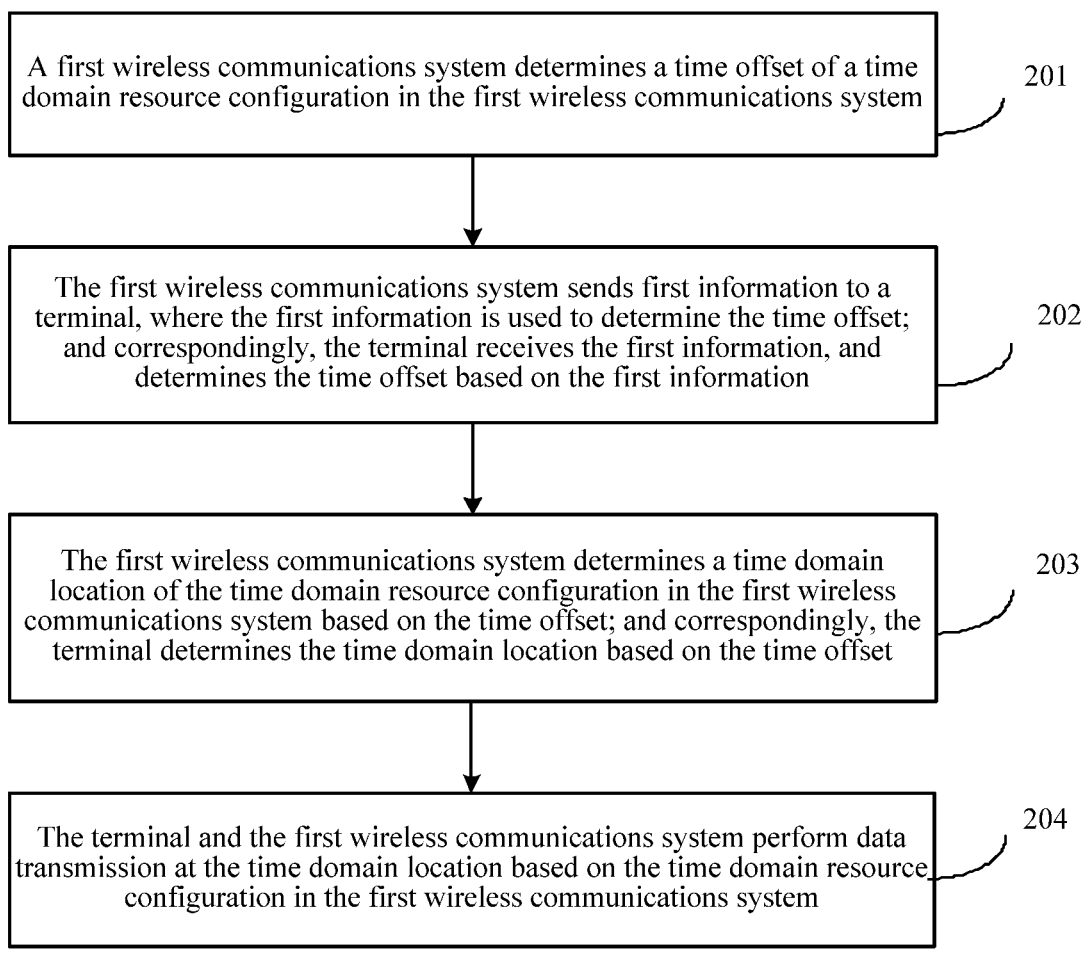
FIG. 2 is a schematic flowchart of a communication processing method according to a first embodiment of this application.

FIG. 2 is a schematic flowchart of the communication processing method. The first embodiment includes the following content.

201: A first wireless communications system determines a time offset of a time domain resource configuration in the first wireless communications system.

A unit of the time offset may be a transmission time unit, or may be at least one time domain symbol, at least one slot or at least one subframe. The time offset may be used to align transmission time units that have a same time domain resource type in an uplink and downlink switching period and that are in the first wireless communications system and a second wireless communications system.

"Alignment" herein may be understood as that at a same data transmission moment, a time domain resource type of data transmission in the first wireless communications system and a time domain resource type of data transmission in the second wireless communications system are the same or do not interfere with each other (for example, because a terminal neither performs receiving or sending on a time domain resource of an unknown type in a 5G system, interference is not caused regardless of a time domain resource type of an LTE system on the time domain resource). Briefly, at a specific data transmission moment, the time domain resource type of data transmission in the first wireless communications system and the second wireless communications system is either an uplink time domain resource type for performing uplink data transmission, or a downlink time domain resource type for performing downlink data transmission, or there is the unknown type, to avoid existence of both the uplink data transmission and the downlink data transmission at the same data transmission moment.

Optionally, the first wireless communications system is the 5G system, and the second wireless communications system is an LTE TDD system. A transmission time unit may be a slot including 14 time domain symbols.

Figure 3:
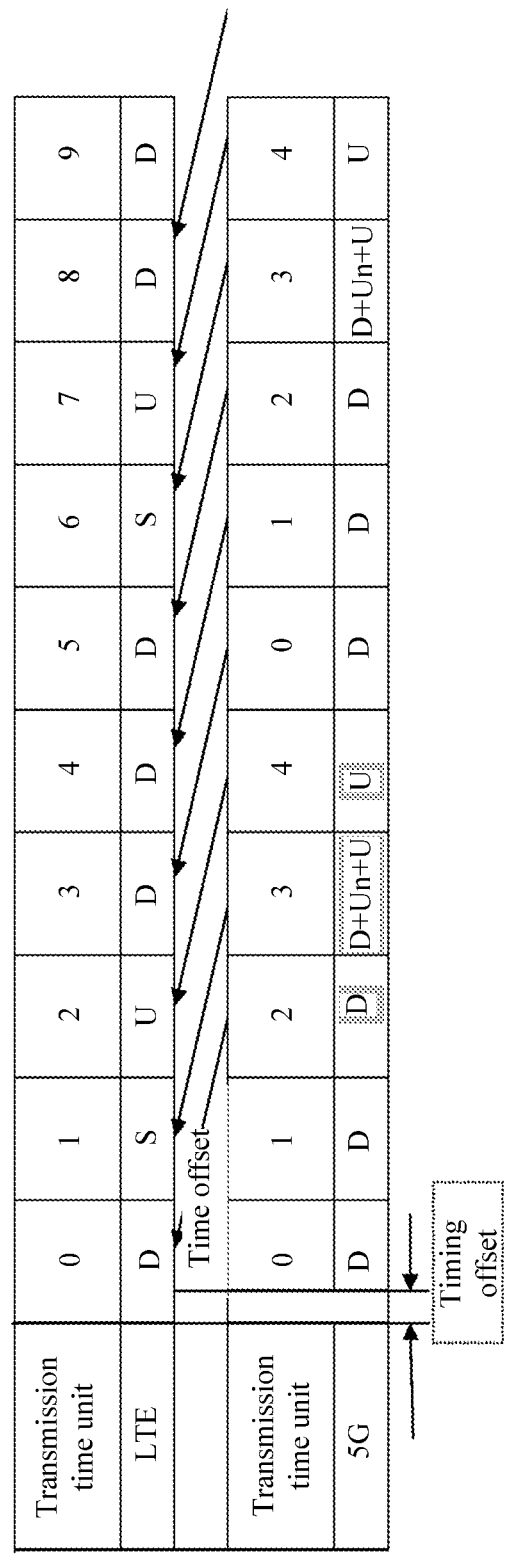
FIG. 3 is a diagram of an example of determining a time offset according to the first embodiment of this application.

In an example, the time domain resource configuration 2 in the LTE TDD system is still used as an example. As shown in FIG. 3, a transmission time unit 0 in the LTE TDD system and a transmission time unit 2 in the 5G system are of the downlink time domain resource type. In addition, for a same data transmission moment, if two transmission time units are offset when the 5G system performs data transmission, the LTE TDD system and the 5G system are of a same time domain resource type on each transmission time unit regardless of a data transmission moment, to avoid interference, and the time offset is determined as two transmission time units.

202: The first wireless communications system sends first information to a terminal, where the first information is used to determine the time offset; and correspondingly, the terminal receives the first information, and determines the time offset based on the first information.

Optionally, the first information may be carried in a system message such as a master information block (MIB) or a system information block (SIB) or remaining system information or other system information (OSI), a broadcast message, an RRC message, a MAC message, or downlink control information of a PDCCH.

Optionally, the first information is the time offset or an index of the time offset. Alternatively, the first information is an index of the time domain resource configuration in the second wireless communications system, and the time domain resource configuration in the second wireless communications system corresponds to the time offset.

In an implementation, when the first wireless communications system is the fifth-generation wireless communications system and the second wireless communications system is an LTE system, a correspondence between the time domain resource configuration in the second wireless communications system and the time offset is shown in Table 3.

TABLE 3

| Index of a time domain resource configuration in the LTE system | 0 | 1 | 2 | 3 | 4 | 5 |
|---|---|---|---|---|---|---|
| Uplink and downlink switching period | 5 ms | 5 ms | 5 ms | 10 ms | 10 ms | 10 ms |
| Time offset (unit: transmission time unit) | (0+E) %5 | (1+E) %5 | (2+E) %5 | (5+E) %10 | (6+E) %10 | (7+E) %10 |

E is a timing offset between the second wireless communications system and the first wireless communications system, and when timing is synchronized between the first wireless communications system and the second wireless communications system, a value of the timing offset is 0. The timing offset indicates an advance of a first subframe or slot in a system frame in the second communications system relative to a first subframe or slot in a system frame in the first communications system. The advance may be a quantity of slots or subframes, or may be an absolute time value, and % indicates a modulo operation.

In this case, the first information may indicate an index of an uplink configuration in the second wireless communications system. The terminal may determine the time offset based on the correspondence that is preset in the terminal and that is between the time domain resource configuration in the second wireless communications system and the time offset.

203: The first wireless communications system determines a time domain location of the time domain resource configuration in the first wireless communications system based on the time offset; and correspondingly, the terminal determines the time domain location based on the time offset.

Because a timing offset may exist between the first wireless communications system and the second wireless communications system, the transmission time units 0 of the two wireless communications systems are not synchronized in time. The timing offset may be an absolute time value or a quantity of transmission time units. As shown in FIG. 3, when the time domain location of the time domain resource configuration in the first wireless communications system is determined, the first wireless communications system determines the time domain location based on the time offset and the timing offset. Correspondingly, the first wireless communications system may further send second information to the terminal. The second information indicates whether the timing offset exists. If the timing offset exists, a value of the timing offset is indicated in the second information. Therefore, after receiving the second information, the terminal may determine the time domain location of the time domain resource configuration in the first wireless communications system based on the time offset and the timing offset.

Optionally, instead of notifying the terminal of the timing offset, the first wireless communications system may further notify the terminal of the time offset after determining the time offset based on the timing offset, so that the terminal does not need to process the timing offset.

204: The terminal and the first wireless communications system perform data transmission at the time domain location based on the time domain resource configuration in the first wireless communications system.

The technical solution provided in the first embodiment is applied. The time offset of the time domain resource configuration in the first wireless communications system is determined, so that the transmission time units that have the same time domain resource type in the uplink and downlink switching period and that are in the first wireless communications system and the second wireless communications system are aligned. In this way, interference caused by existence of both uplink data transmission and downlink data transmission on the transmission time units at the same data transmission moment is avoided.

Figure 4:
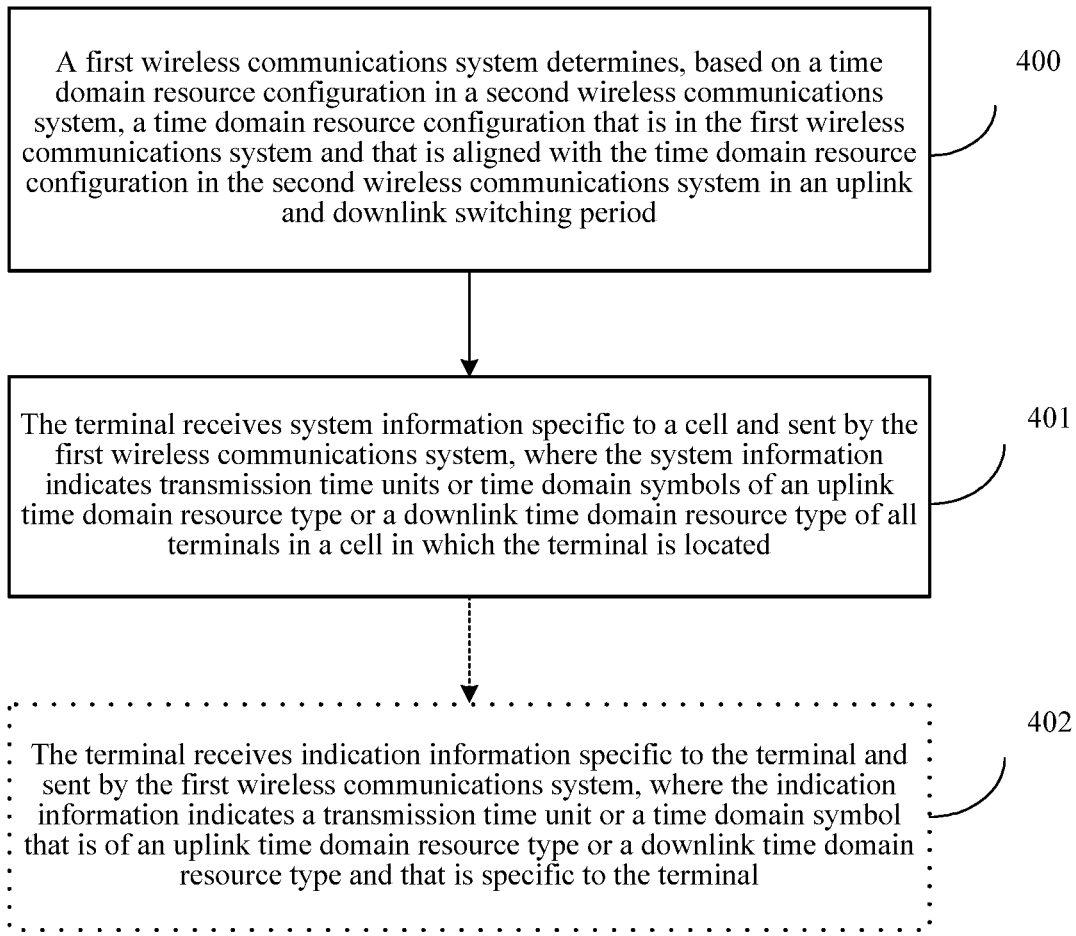
FIG. 4 is a schematic flowchart of another communication processing method according to a second embodiment of this application.

A second embodiment of this application provides another communication processing method. Compared with the first embodiment, a data transmission mode of a first wireless communications system on each transmission time unit is directly determined based on a time domain configuration in a second wireless communications system, so that a time domain symbol is used for either uplink data transmission or downlink data transmission. In this way, interference is avoided. As shown in FIG. 4, the second embodiment includes the following content.

400: The first wireless communications system determines, based on a time domain resource configuration in the second wireless communications system, a time domain resource configuration that is in the first wireless communications system and that is aligned with the time domain resource configuration in the second wireless communications system in an uplink and downlink switching period, where the first wireless communications system and the second wireless communications system have a same time domain resource type on a same transmission time unit.

For example, for any same transmission time unit in the first wireless communications system and the second wireless communications system, the first wireless communications system on this transmission time unit is of either a downlink time domain resource type or an uplink time domain resource type, or is of either a downlink time domain resource type or an uplink time domain resource type on a same time domain symbol in this transmission time unit.

401: The terminal receives system information specific to a cell and sent by the first wireless communications system, where the system information indicates transmission time units or time domain symbols of an uplink time domain resource type or a downlink time domain resource type of all terminals in a cell in which the terminal is located.

Optionally, 402: The terminal receives indication information specific to the terminal and sent by the first wireless communications system, where the indication information indicates a transmission time unit or a time domain symbol that is of an uplink time domain resource type or a downlink time domain resource type and that is specific to the terminal.

In 401, because the system information may be broadcast in the cell, all the terminals in the cell in which the terminal is located can receive the system information, and determine the transmission time unit that is of the uplink time domain resource type or the downlink time domain resource type and that is indicated by the system information, or some time domain symbols in a specific transmission time unit. For a transmission time unit or a time domain symbol that is not indicated by the system information, the terminal may consider by default that these transmission time units are of an unknown type.

In 402, because the indication information is specific to the terminal, this terminal may determine transmission time units or time domain symbols that are in the uplink time domain resource type and that are indicated by the indication information and transmission time units or time domain symbols that are in the downlink time domain resource type and that are indicated by the indication information. The transmission time unit or the time domain symbol that is of the uplink time domain resource type or the downlink data resource type and that is indicated by the indication information is a transmission time unit or a time domain symbol that is not indicated by the system information in 401, or is a transmission time unit or a time domain symbol that is indicated to be of the unknown type.

In a implementation of this embodiment, the 5G system determines, based on time domain resource configurations 0 to 5 in LTE TDD, time domain resource configurations in the 5G system that are respectively aligned with the time domain resource configurations 0 to 5 in LTE TDD. The 5G system may send, to the terminal, the system information specific to the cell in which the terminal is located and the indication information specific to the terminal, to notify the time domain resource configurations in the 5G system.

(1) For the time domain resource configuration 0 in LTE TDD, an uplink and downlink switching period is five transmission time units. A time domain resource type of each transmission time unit or time domain symbol within the uplink and downlink switching period is notified by using the system information. In this case, notification by using the indication information specific to the terminal is unnecessary.

Time domain resource configuration in the 5G system co-exists with the time domain resource configuration 0 in LTE TDD

|  | Transmission time unit in LTE | | | | |
| --- | --- | --- | --- | --- | --- |
|  | 0 | 1 | 2 | 3 | 4 |
| Time domain resource configuration in LTE TDD | D | S | U | U | U |
| Transmission time unit in 5G | (0+E) % N | (1+E) % N | (2+E) % N | (3+E) % N | (4+E) % N |
| Time domain resource configuration in 5G | D | D+Un+U | U | U | U |

N is a quantity of transmission time units included in a radio frame in the 5G system, and E is a timing offset between the 5G system and the LTE TDD system. When the 5G and LTE TDD systems are synchronized, E=0.

(2) For the time domain resource configuration 1 in LTE TDD, an uplink and downlink switching period is five transmission time units. The time domain resource configuration in 5G is notified by using the system information specific to the cell in which the terminal is located and the indication information specific to the terminal.

Time domain resource configuration in the 5G system co-exists with the time domain resource configuration 1 in LTE TDD

| Transmission time unit in LTE | 0 | 1 | 2 | 3 | 4 | 5 | 6 | 7 | 8 | 9 |
| --- | --- | --- | --- | --- | --- | --- | --- | --- | --- | --- |
| Time domain resource configuration in LTE TDD | D | S | U | U | D | D | S | U | U | D |
| Transmission time unit in 5G | (0+E) % N | (1+E) % N | (2+E) % N | (3+E) % N | (4+E) % N | (5+E) % N | (6+E) % N | (7+E) % N | (8+E) % N | (9+E) % N |
| Time domain resource configuration in 5G | D | D+Un+U | U | U | D | D | D+Un+U | U | U | D |

N is a quantity of transmission time units included in a radio frame in the 5G system, and E is a timing offset between the 5G system and the LTE TDD system. When the 5G and LTE TDD systems are synchronized, E=0.

The system information specific to the cell in which the terminal is located notifies a time domain resource configuration within an uplink and downlink switching period as:

|  | Transmission time unit in 5G | | | | |
| --- | --- | --- | --- | --- | --- |
|  | (0+E) % N | (1+E) % N | (2+E) % N | (3+E) % N | (4+E) % N |
| Time domain resource configuration in 5G | D | D+Un | Un | Un | Un |

The indication information specific to the terminal notifies a time domain resource configuration that is not notified or a time domain resource configuration that is notified to be of the unknown type within an uplink and downlink switching period in the system information.

|  | Transmission time unit in 5G | | | | |
| --- | --- | --- | --- | --- | --- |
|  | (0+E) % N | (1+E) % N | (2+E) % N | (3+E) % N | (4+E) % N |
| Time domain resource configuration in 5G | Un | D+Un+U | U | U | D |

The terminal may determine a time domain resource type in each transmission time unit and each time domain symbol within the uplink and downlink switching period in combination with the system information and the indication information specific to the terminal.

(3) For the time domain resource configuration 2 in LTE TDD, an uplink and downlink switching period is 10 transmission time units. The time domain resource configuration in 5G is notified by using the system information specific to the cell in which the terminal is located and the indication information specific to the terminal.

Time domain resource configuration in the 5G system co-exists with the time domain resource configuration 2 in LTE TDD

| Transmission time unit in LTE | 0 | 1 | 2 | 3 | 4 | 5 | 6 | 7 | 8 | 9 |
|---|---|---|---|---|---|---|---|---|---|---|
| Time domain resource configuration in LTE TDD | D | S | U | D | D | D | S | U | D | D |
| Transmission time unit in 5G | (0+E) % N | (1+E) % N | (2+E) % N | (3+E) % N | (4+E) % N | (5+E) % N | (6+E) % N | (7+E) % N | (8+E) % N | (9+E) % N |
| Time domain resource configuration in 5G | D | D+ Un+U | U | D | D | D | D+ Un+U | U | D | D |

N is a quantity of transmission time units included in a radio frame in the 5G system, and E is a timing offset between the 5G system and the LTE TDD system. When the 5G and LTE TDD systems are synchronized, E=0.

The system information specific to the cell in which the terminal is located notifies a time domain resource configuration within an uplink and downlink switching period as:

|  | Transmission time unit in 5G | | | | |
|---|---|---|---|---|---|
|  | (0+E) % N | (1+E) % N | (2+E) % N | (3+E) % N | (4+E) % N |
| Time domain resource configuration in 5G | D | D+Un | Un | Un | Un |

The indication information specific to the terminal notifies a time domain resource configuration that is not notified or a time domain resource configuration that is notified to be of the unknown type within an uplink and downlink switching period in the system information.

|  | Transmission time unit in 5G | | | | |
|---|---|---|---|---|---|
|  | (0+E) % N | (1+E) % N | (2+E) % N | (3+E) % N | (4+E) % N |
| Time domain resource configuration in 5G | Un | D + Un + U | U | D | D |

(4) For a time domain resource configuration in 5G that co-exists with the time domain resource configuration 3 in LTE TDD, an uplink and downlink switching period is 10 transmission time units. The time domain resource configuration in 5G is notified by using the system information specific to the cell in which the terminal is located and the indication information specific to the terminal.

Time domain resource configuration in 5G co-exists with the time domain resource configuration 3 in LTE TDD

| Transmission time unit in LTE | 0 | 1 | 2 | 3 | 4 | 5 | 6 | 7 | 8 | 9 |
|---|---|---|---|---|---|---|---|---|---|---|
| Time domain resource configuration in LTE TDD | D | S | U | U | U | D | D | D | D | D |
| Transmission time unit in 5G | (0+E) % N | (1+E) % N | (2+E) % N | (3+E) % N | (4+E) % N | (5+E) % N | (6+E) % N | (7+E) % N | (8+E) % N | (9+E) % N |
| Time domain resource configuration in 5G | D | D+Un+U | U | U | U | D | D | D | D | D |

N is a quantity of transmission time units included in a radio frame in the 5G system, and E is a timing offset between the 5G system and the LTE TDD system. When the 5G and LTE TDD systems are synchronized, E=0.

The system information specific to the cell in which the terminal is located notifies a time domain resource configuration within an uplink and downlink switching period as:

| Transmission time unit in 5G | (0+E) % N | (1+E) % N | (2+E) % N | (3+E) % N | (4+E) % N | (5+E) % N | (6+E) % N | (7+E) % N | (8+E) % N | (9+E) % N |
|---|---|---|---|---|---|---|---|---|---|---|
| Time domain resource configuration in 5G | D | D+Un | Un | Un | Un | Un | Un | Un | Un | Un |

The indication information specific to the terminal notifies a time domain resource configuration that is not notified or a time domain resource configuration that is notified to be of the unknown type within an uplink and downlink switching period in the system information.

| Transmission time unit in 5G | (0+E) % N | (1+E) % N | (2+E) % N | (3+E) % N | (4+E) % N | (5+E) % N | (6+E) % N | (7+E) % N | (8+E) % N | (9+E) % N |
|---|---|---|---|---|---|---|---|---|---|---|
| Time domain resource configuration in 5G | D | D+Un+U | U | U | U | D | D | D | D | D |

(5) For a time domain resource configuration in 5G that co-exists with the time domain resource configuration 4 in LTE TDD, an uplink and downlink switching period is 10 transmission time units. The time domain resource configuration in 5G is notified by using the system information specific to the cell in which the terminal is located and the indication information specific to the terminal.

Time domain resource configuration in 5G co-exists with the configuration 4 in LTE TDD

| Transmission time unit in LTE | 0 | 1 | 2 | 3 | 4 | 5 | 6 | 7 | 8 | 9 |
|---|---|---|---|---|---|---|---|---|---|---|
| Time domain resource configuration in LTE TDD | D | S | U | U | D | D | D | D | D | D |
| Transmission time unit in 5G | (0+E) % N | (1+E) % N | (2+E) % N | (3+E) % N | (4+E) % N | (5+E) % N | (6+E) % N | (7+E) % N | (8+E) % N | (9+E) % N |
| Time domain resource configuration in 5G | D | D+Un+U | U | U | D | D | D | D | D | D |

N is a quantity of transmission time units included in a radio frame in the 5G system, and E is a timing offset between the 5G system and the LTE TDD system. When the 5G and LTE TDD systems are synchronized, E=0.

The system information specific to the cell in which the terminal is located notifies a time domain resource configuration within an uplink and downlink switching period as:

| Transmission time unit in 5G | (0+E) % N | (1+E) % N | (2+E) % N | (3+E) % N | (4+E) % N | (5+E) % N | (6+E) % N | (7+E) % N | (8+E) % N | (9+E) % N |
|---|---|---|---|---|---|---|---|---|---|---|
| Time domain resource configuration in 5G | D | D+Un | Un | Un | Un | Un | Un | Un | Un | Un |

The indication information specific to the terminal notifies a time domain resource configuration that is not notified or a time domain resource configuration that is notified to be of the unknown type within an uplink and downlink switching period in the system information.

| Transmission time unit in 5G | (0+E) % N | (1+E) % N | (2+E) % N | (3+E) % N | (4+E) % N | (5+E) % N | (6+E) % N | (7+E) % N | (8+E) % N | (9+E) % N |
|---|---|---|---|---|---|---|---|---|---|---|
| Time domain resource configuration in 5G | D | D+Un+U | U | U | D | D | D | D | D | D |

(6) For a time domain resource configuration in 5G that co-exists with the time domain resource configuration 5 in LTE TDD, an uplink and downlink switching period is 10 transmission time units. The time domain resource configuration in 5G is notified by using the system information specific to the cell in which the terminal is located and the indication information specific to the terminal.

Time domain resource configuration in 5G co-exists with the time domain resource configuration 5 in LTE TDD

| Transmission time unit in LTE | 0 | 1 | 2 | 3 | 4 | 5 | 6 | 7 | 8 | 9 |
|---|---|---|---|---|---|---|---|---|---|---|
| Time domain resource configuration in LTE TDD | D | S | U | D | D | D | D | D | D | D |

| Transmission time unit in 5G | (0+E) % N | (1+E) % N | (2+E) % N | (3+E) % N | (4+E) % N | (5+E) % N | (6+E) % N | (7+E) % N | (8+E) % N | (9+E) % N |
|---|---|---|---|---|---|---|---|---|---|---|
| Time domain resource configuration in 5G | D | D+ Un+U | U | D | D | D | D | D | D | D |

N is a quantity of transmission time units included in a radio frame in the 5G system, and E is a timing offset between the 5G system and the LTE TDD system. When the 5G and LTE TDD systems are synchronized, E=0.

The system information specific to the cell in which the terminal is located notifies a time domain resource configuration within an uplink and downlink switching period as:

| Transmission time unit in 5G | (0+E) % N | (1+E) % N | (2+E) % N | (3+E) % N | (4+E) % N | (5+E) % N | (6+E) % N | (7+E) % N | (8+E) % N | (9+E) % N |
|---|---|---|---|---|---|---|---|---|---|---|
| Time domain resource configuration in 5G | D | D+Un | Un | Un | Un | Un | Un | Un | Un | Un |

The indication information specific to the terminal notifies a time domain resource configuration that is not notified or a time domain resource configuration that is notified to be of the unknown type within an uplink and downlink switching period in the system information.

| Transmission time unit in 5G | (0+E) % N | (1+E) % N | (2+E) % N | (3+E) % N | (4+E) % N | (5+E) % N | (6+E) % N | (7+E) % N | (8+E) % N | (9+E) % N |
|---|---|---|---|---|---|---|---|---|---|---|
| Time domain resource configuration in 5G | D | D+ Un+U | U | D | D | D | D | D | D | D |

The technical solution provided by the second embodiment of this application is applied. The first wireless communications system may perform the time domain resource configuration in the first wireless communications system based on the time domain resource configuration in the second wireless communications system, so that uplink data transmission and downlink data transmission do not exist at a same time. The first wireless communications system notifies the terminal of a result of the time domain resource configuration in the first wireless communications system by using a system message or further including the indication information specific to the terminal, so that the terminal learns of the time domain resource configuration in the first wireless communications system to perform data transmission with the first wireless communications system. In this way, interference is avoided.

Figure 5:
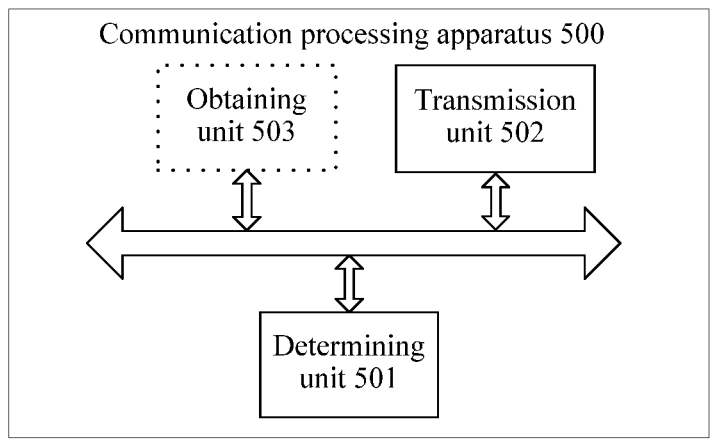
FIG. 5 is a schematic structural diagram of a communication processing apparatus according to an embodiment of this application.

A third embodiment of this application provides a communication processing apparatus 500. FIG. 5 is schematic structural diagram of the communication processing apparatus. The communication processing apparatus 500 includes a determining unit 501 and a transmission unit 502.

The communication processing apparatus 500 provided by the third embodiment of this application may be a terminal or a chip in the terminal, and is configured to implement the method performed by the terminal in the first embodiment. Correspondingly, the communication processing apparatus 500 further includes an obtaining unit 503. The obtaining unit 503 is configured to perform an obtaining action of the terminal in the first embodiment, the determining unit 501 is configured to perform a determining action of the terminal, and the transmission unit 502 is configured to perform a receiving action and a sending action. For details, refer to the content described in the first embodiment.

The communication processing apparatus 500 provided by the third embodiment of this application may be a radio access device in a first wireless communications system or a chip in the radio access device, and is configured to implement the method performed by the first wireless communications system in the first embodiment. The determining unit 501 is configured to perform a determining action of the first wireless communications system, and the transmission unit 502 is configured to perform data transmission of the first wireless communications system, such as a receiving action and a sending action. For details, refer to the content described in the first embodiment.

The communication processing apparatus 500 provided by the third embodiment of this application may be a terminal or a chip in the terminal, and is configured to implement the method performed by the terminal in the second embodiment of this application. The determining unit 501 is configured to determine a time domain resource configuration in a first wireless communications system based on system information specific to a cell and indication information specific to a terminal (optional) that are obtained from the first wireless communications system. The transmission unit 502 is configured to perform data transmission based on the time domain resource configuration in the first wireless communications system. For details, refer to the content described in the second embodiment.

The communication processing apparatus 500 provided by the third embodiment of this application may be a radio access device in a first wireless communications system or a chip in the radio access device, and is configured to implement the method performed by the first wireless communications system in the second embodiment of this application. The determining unit 501 is configured to determine, based on a time domain resource configuration in a second first wireless communications system, a time domain resource configuration that is in the first wireless communications system and that is aligned with the time domain resource configuration in the second wireless communications system. The transmission unit 502 is configured to perform data transmission with a terminal based on the time domain resource configuration in the first wireless communications system.

Figure 6:
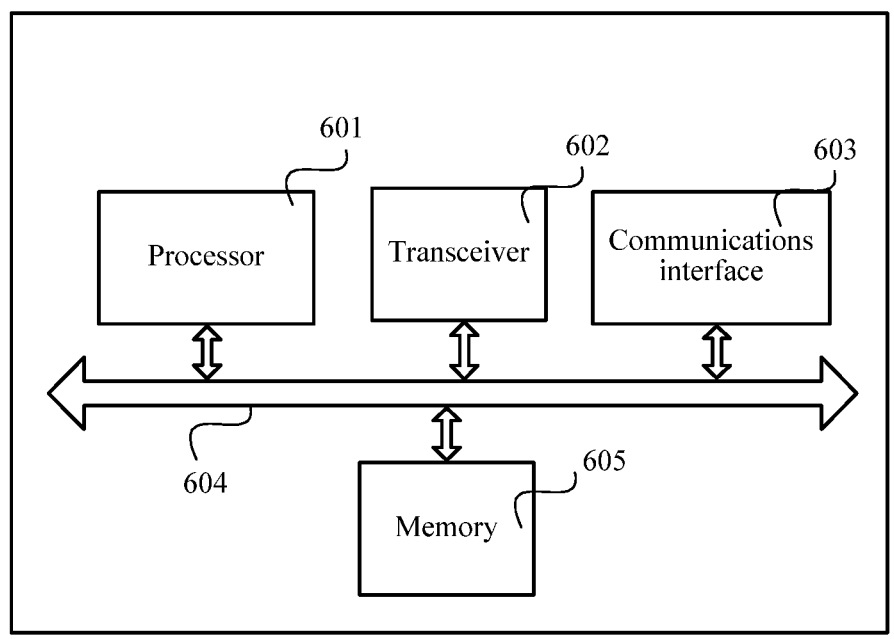
FIG. 6 is another schematic structural diagram of a communication processing apparatus according to an embodiment of this application.

In a specific hardware implementation, FIG. 6 is schematic structural diagram of hardware of the communication processing apparatus. A function of the determining unit 501 may be implemented by a processor 601, and functions of the transmission unit 502 and the obtaining unit 503 may both be implemented by a transceiver 602. The communication processing apparatus may further include various electronic circuits, such as a communications interface 603, a bus 604, and a memory 605.

The communications interface may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a wireless local area network interface.

The bus may be a peripheral component interconnect (PCI) bus or an extended industry standard architecture (EISA), and the like. The bus may be classified into an address bus, a data bus, a control bus, and the like.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the apparatus (system), and the computer program product according to the embodiments of this application. It is understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

What is claimed is:

1. A communication processing method, comprising:
obtaining first information sent by a first wireless communications system, wherein the first information is used to determine a time offset of a time domain resource configuration in the first wireless communications system, wherein one or more types of the time domain resource configuration include a downlink time domain resource, an uplink time domain resource, and an unknown type of configuration;
determining a time domain location of the time domain resource configuration in the first wireless communications system based on the time offset to reduce interference caused by existence of a same type time domain resource at the time domain location, wherein the first wireless communications system is a fifth-generation wireless communications system, and a second wireless communications system is a long term evolution (LTE) system; and
there is the following correspondence between the time domain resource configuration in the second wireless communications system and the time offset:

| Index of a time domain resource configuration in the LTE system | 0 | 1 | 2 | 3 | 4 | 5 |
|---|---|---|---|---|---|---|
| Time offset (unit: transmission time unit) | (0+E) %5 | (1+E) %5 | (2+E) %5 | (5+E) %10 | (6+E) %10 | (7+E) %10 | wherein E is a timing offset between the second wireless communications system and the first wireless communications system, and when timing is synchronized between the first wireless communications system and the second wireless communications system, a value of the timing offset is 0, and % is a modulo operation; and
performing data transmission at the time domain location based on the time domain resource configuration in the first wireless communications system.

2. The method according to claim 1, wherein
the first information is the time offset or an index of the time offset; or
the first information is an index of a time domain resource configuration in the second wireless communications system, and the index of the time domain resource configuration in the second wireless communications system corresponds to the time offset.

3. The method according to claim 1, wherein the time offset is used to align transmission time units that have a same type of time domain resource in an uplink and downlink switching period and that are in the first wireless communications system and the second wireless communications system.

4. The method according to claim 1, further comprising:
obtaining second information sent by the first wireless communications system, wherein the second information indicates a timing offset of the first wireless communications system.

5. A communication processing apparatus, comprising:
a processor; and
a memory coupled to the processor to store instructions, which when executed by the processor, cause the processor to perform operations, the operations including:
obtaining first information sent by a first wireless communications system, wherein the first information is used to determine a time offset of a time domain resource configuration in the first wireless communications system, wherein one or more types of the time domain resource configuration include a downlink time domain resource, an uplink time domain resource, and an unknown type of configuration;
determining a time domain location of the time domain resource configuration based on the time offset to reduce interference caused by existence of a same type time domain resource at the time domain location, wherein the first wireless communications system is a fifth-generation wireless communications system, and a second wireless communications system is a long term evolution (LTE) system; and
there is the following correspondence between the time domain resource configuration in the second wireless communications system and the time offset:

| Index of a time domain resource configuration in the LTE system | 0 | 1 | 2 | 3 | 4 | 5 |
|---|---|---|---|---|---|---|
| Time offset (unit: transmission time unit) | (0+E) %5 | (1+E) %5 | (2+E) %5 | (5+E) %10 | (6+E) %10 | (7+E) %10 | wherein E is a timing offset between the second wireless communications system and the first wireless communications system, and when timing is synchronized between the first wireless communications system and the second wireless communications system, a value of the timing offset is 0, and % is a modulo operation; and
performing data transmission at the time domain location based on the time domain resource configuration in the first wireless communications system.

6. The apparatus according to claim 5, wherein
the first information is the time offset or an index of the time offset; or
the first information is an index of a time domain resource configuration in the second wireless communications system, and the index of the time domain resource configuration in the second wireless communications system corresponds to the time offset.

7. The apparatus according to claim 5, wherein the time offset is used to align transmission time units that have a same type of time domain resource in an uplink and downlink switching period and that are in the first wireless communications system and the second wireless communications system.

8. The apparatus according to claim 5, wherein the operations further comprise:
obtaining second information sent by the first wireless communications system, wherein the second information indicates a timing offset of the first wireless communications system.

9. A non-transitory computer-readable medium having stored thereon executable instructions that, when executed by a processing system having at least one hardware processor, perform operations of a communication processing method, applied to a terminal or a chip in the terminal, and the operations comprising:
obtaining first information sent by a first wireless communications system, wherein the first information is used to determine a time offset of a time domain resource configuration in the first wireless communications system, wherein one or more types of the time domain resource configuration include a downlink time domain resource, an uplink time domain resource, and an unknown type of configuration;
determining a time domain location of the time domain resource configuration in the first wireless communications system based on the time offset to reduce interference caused by existence of a same type time domain resource at the time domain location, wherein the first wireless communications system is a fifth-generation wireless communications system, and a second wireless communications system is a long term evolution (LTE) system; and
there is the following correspondence between the time domain resource configuration in the second wireless communications system and the time offset:

| Index of a time domain resource configuration in the LTE system | 0 | 1 | 2 | 3 | 4 | 5 |
| --- | --- | --- | --- | --- | --- | --- |
| Time offset (unit: transmission time unit) | (0+E)%5 | (1+E)%5 | (2+E)%5 | (5+E)%10 | (6+E)%10 | (7+E)%10 | wherein E is a timing offset between the second wireless communications system and the first wireless communications system, and when timing is synchronized between the first wireless communications system and the second wireless communications system, a value of the timing offset is 0, and % is a modulo operation; and
performing data transmission at the time domain location based on the time domain resource configuration in the first wireless communications system.

10. The medium according to claim 9, wherein
the first information is the time offset or an index of the time offset; or
the first information is an index of a time domain resource configuration in the second wireless communications system, and the index of the time domain resource configuration in the second wireless communications system corresponds to the time offset.

11. The medium according to claim 9, wherein the time offset is used to align transmission time units that have a same type of time domain resource type in an uplink and downlink switching period and that are in the first wireless communications system and the second wireless communications system.

12. The medium according to claim 9, the operations further comprising:
obtaining second information sent by the first wireless communications system, wherein the second information indicates a timing offset of the first wireless communications system.

\* \* \* \* \*